United States Patent [19]

Guichard

[11] Patent Number: 4,954,737
[45] Date of Patent: Sep. 4, 1990

[54] PULSE GENERATOR FOR A ROTARY SPEED SENSOR

[75] Inventor: Jean Guichard, La Garenne Colombes, France

[73] Assignee: Messier-Hispano-Bugatti, Montrouge, France

[21] Appl. No.: 369,606

[22] Filed: Jun. 21, 1989

[30] Foreign Application Priority Data

Jun. 30, 1988 [FR] France .................. 88 08837

[51] Int. Cl.⁵ .......................... H02K 1/22; G01P 3/48
[52] U.S. Cl. ................... 310/168; 310/67 R; 310/261; 310/266
[58] Field of Search .............. 84/408; 310/51, 160, 310/171, 261, 268, 67 R, 266; 324/161, 166, 173

[56] References Cited

U.S. PATENT DOCUMENTS

| | | | |
|---|---|---|---|
| 3,469,124 | 9/1969 | Willcox | 310/266 |
| 4,027,753 | 7/1977 | Lantz | 310/168 |
| 4,096,624 | 6/1978 | Gray et al. | 310/168 |
| 4,282,451 | 8/1981 | Bratoljic | 310/261 |
| 4,409,506 | 10/1983 | Ito et al. | 310/261 |

FOREIGN PATENT DOCUMENTS 553535  7/1977  U.S.S.R. .................. 324/173

*Primary Examiner*—Steven L. Stephan
*Assistant Examiner*—D. L. Rebsch
*Attorney, Agent, or Firm*—Sixbey, Friedman, Leedom & Ferguson

[57] ABSTRACT

A pulse generator in which a magnetic circuit is closed by a portion of a wall (5) of a cylindrical part rotating about its axis and coupled at one of its ends to a drive member (7). The wall portion and a fixed part (1) together define an air gap which varies depending on the relative angular positions of the wall portion and the fixed part such that during rotation magnetic field variations are generated at a frequency proportional to the speed of rotation of the rotating part. The generator includes an electrically conductive winding (4) in which the field variations generate electrical pulses, and the rotating cylindrical part (5) includes at least one longitudinal slot (8).

4 Claims, 1 Drawing Sheet

4,954,737

PULSE GENERATOR FOR A ROTARY SPEED SENSOR

The present invention relates to a generator for generating electric pulses at a frequency proportional to the speed of rotation of a rotary member to which it is coupled.

BACKGROUND OF THE INVENTION

Tachometers are known based on the principle of varying a magnetic field as a function of the speed of rotation of a rotating member and of using a coil to transform these field variations into an electrical current of variable frequency equal to the frequency at which the field varies. Thus, an electrical signal is generated representative of the speed of rotation of the rotating member.

One embodiment of this type of device thus comprises a stationary permanent magnet having one of its poles in the form of a disk or ring with teeth around its periphery and received in a tubular body likewise having a toothed surface facing the toothed surface of the magnet and constituting a part for closing the magnetic circuit and extending to the other pole.

It will be understood that the teeth constitute a means for varying the air gap between the pole in question and the tubular part. If the tubular part is rotated, then its teeth are moved relative to the teeth on the pole of the magnet, thereby changing the air gap and consequently changing the magnetic field. Assuming that the teeth are at the same pitch on the tubular part and on the magnet, a relative angular displacement equal to one pitch unit causes the air gap to vary through a maximum and a minimum. The magnetic field varies in the same way and the current induced in a winding through which the variable magnetic field passes will give rise to a signal representative of the speed of rotation of the tubular part.

A similar device can therefore be used as a tachometer or speed sensor for a body rotating at a variable speed. When applied to an aircraft wheel, for example, the tubular part is coupled to the wheel and the fixed part is integral with the axle. However, it has been observed that this sensor is sensitive to the vibration to which it is subjected, and that the tubular body may enter into resonance with such vibration. The vibrational deformation of the tubular body (analogous to that of a bell) give rise to changes in the air gap which constitute a source of an interfering electrical signal. The frequency of this noise, and sometimes its amplitude, are of the same order as the corresponding features of the signal at low speeds of rotation of an aircraft wheel. In the past, this "noise" has been removed by filtering, thereby reducing the useful range of the sensor.

The present invention seeks to provide a different solution for removing this noise, whereby sensor operation is maintained over a wider frequency band.

SUMMARY OF THE INVENTION

To this end, the present invention provides a pulse generator in which a magnetic circuit is closed by a portion of a wall of a cylindrical part rotating about its axis and coupled at one of its ends to a drive member, said wall portion and a fixed part together defining an air gap which varies, depending on the relative angular positions of the wall portion and the fixed part, such that during rotation magnetic field variations are generated at a frequency proportional to the speed of rotation of the rotating part, the generator including and electrically conductive winding in which the field variations generates electrical pulses, wherein the rotating cylindrical part includes at least one longitudinal slot.

BRIEF DESCRIPTION OF THE DRAWING

An embodiment of the invention is described by way of example with reference to the accompanying drawing, in which.

DETAILED DESCRIPTION

Figure 1:
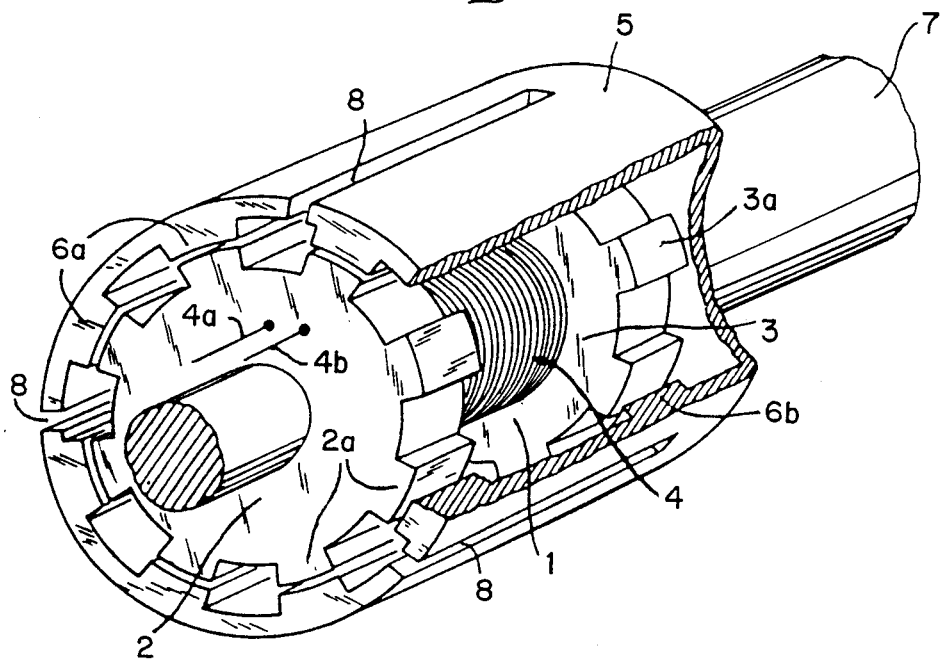
FIG. 1 is a diagrammatic view of an embodiment of the invention.

With reference to FIG. 1, the pulse generator shown comprises a permanent magnet 1 in the form of an elongate bar whose ends are in the form of disks 2 and 3. Each of the disks 2 and 3 is notched around its periphery by a plurality of grooves delimiting intervening lands 2a and 3a which are regularly spaced apart from another.

The central portion of the bar carries an electrically conductive winding 4 such that variation in the magnetic field passing therethrough gives rise to a current collected from the terminals 4a and 4b of this winding. The magnetic circuit is closed between the poles 2 and 3 by a cylindrical wall 5 which has the same number of lands 6a and 6b facing the disks 2 and 3 as the disks have lands. The lands 6a and 6b are angularly distributed around the inside surface of the wall 5 in such a manner that when a land 6a faces a land 2a, then all of the lands on the cylindrical wall 5 are facing respective lands on the disks 2 and 3. In this position, the air gap between the magnet and the wall 5 is at a minimum. In contrast, when the lands of the wall face the grooves in the disks 2 and 3, then the air gap is at a maximum. It can thus be seen that the air gap passes n times through its maximum value and n times through its minimum value if the wall 5 is caused to rotate through one turn about its axis while the magnet remains stationary, with n being the number of lands carried by each of the disks 2 and 3 and at each end of the wall. This cyclical variation in the air gap gives rise to a cyclical variation in the magnetic field passing through the winding 1, and an alternating electrical current is therefore set up in the winding at a frequency which is a function of the speed of rotation of the wall 5 around the magnet 1. This current therefore constitutes a signal which can be used for monitoring the speed of the wall 5, and thus for monitoring the speed of rotation of any rotating shaft 7 to which it may be coupled.

Such an apparatus can thus be used as a tachometer or rotary speed sensor for a rotating body such as an aircraft wheel. This sensor is subjected to numerous vibrations transmitted by the parts to which it is fixed, even when no rolling is taking place. These vibrations are a source of disturbance to the signal due to the fact that the cylindrical wall 5 vibrates at its resonant frequency and this can give rise to variations in the air gap at frequencies which correspond to those which are generated by rolling.

The improvement of the invention consists in splitting the cylindrical wall 5 along one or more generator lines so as to "break" its frequency. Experiments and tests show that one, two, or three slots 8 should be formed in the wall evenly or unevenly disposed around the peripheral direction. The lengths of the slots may be equal or different, as determined by experiment.

This disposition is particularly useful when the rotating part of the sensor is at a distance from the wheel, as is necessary in order to protect it from the heat dissipated during braking. The coupling between the wheel and the sensor is provided by means of a coupling shaft which is relatively long and constitutes and elastic system that generates vibrations which are transmitted to the wall 5.

Figure 2:
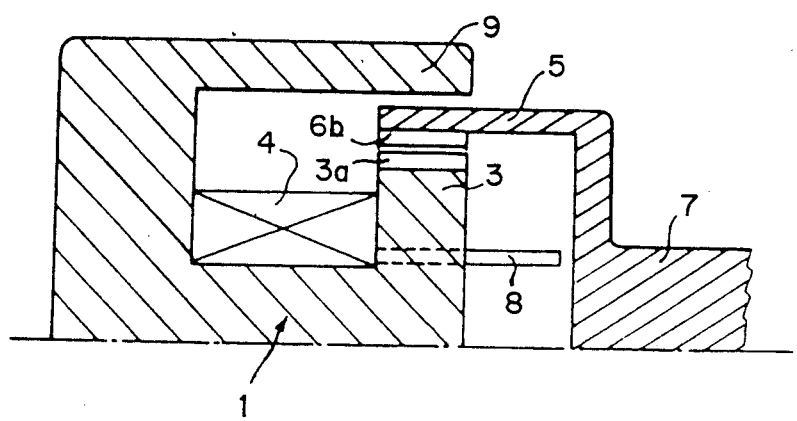
FIG. 2 is a section through a variant of FIG. 1.

FIG. 2 merely shows that the magnetic circuit may be constructed differently, with one of the poles 9 being situated facing the toothed pole 3. The other items shown have the same references as in FIG. 1.

I claim:

1. A pulse generator having a magnetic circuit closed around a stationary part by a portion of the wall of a bell-shaped part rotating about its axis and coupled at one of its ends to a drive member, said wall portion and said stationary part together defining an air gap which varies depending on the relative angular positions of the wall portion and the stationary part, such that during rotation magnetic field variations are generated at a frequency proportional to the speed of rotation of the rotation part, the generator including an electrically conductive winding in which the field variations generate electrical pulses, wherein the wall includes at least one longitudinal slot.

2. A generator according to claim 1, wherein the cylindrical part includes three longitudinal slots.

3. A generator according to claim 1, wherein said slot opens out at the end of the wall which is furthest from the drive member.

4. A pulse generator in which a magnetic circuit is closed by a portion of a wall of cylindrical part rotating about its axis and coupled at one of its ends to a drive member, said wall portion and a fixed part together defining an air gap which varies depending on the relative angular positions of the wall portion and the fixed part such the during rotations magnetic field variations are generated at a frequency proportional to the speed of rotation of the rotating part, the generator including an electrically conductive winding in which the field variations generate electrical pulses, wherein the rotating cylindrical part includes at least one longitudinal slot which opens out at the end of the rotating part which is furthest from the drive member.

* * * * *